United States Patent [19]

Davidson

[11] 4,196,881
[45] Apr. 8, 1980

[54] CAMERA TRIPOD

[76] Inventor: Carson Davidson, 86 Bedford St., New York, N.Y. 10014

[21] Appl. No.: 847,786

[22] Filed: Nov. 2, 1977

[51] Int. Cl.² ............................................ F16M 11/34
[52] U.S. Cl. .................................... 248/157; 248/169; 248/435
[58] Field of Search ............... 248/157, 431, 163, 168, 248/169, 165, 166, 188.5, 435, 434

[56] References Cited

U.S. PATENT DOCUMENTS

| | | | |
|---|---|---|---|
| 967,471 | 8/1910 | Wanamaker | 248/166 |
| 1,171,568 | 2/1916 | Wanamaker | 248/435 |
| 2,493,978 | 1/1950 | Kromer | 248/169 |
| 2,703,691 | 3/1955 | Minnis | 248/188.5 |
| 2,940,708 | 6/1960 | Grimal | 248/168 |
| 3,963,207 | 6/1976 | Guasti | 248/168 |
| 3,987,807 | 10/1976 | Varnell | 248/188.5 |
| 4,015,806 | 4/1977 | Cattermole | 248/431 |

FOREIGN PATENT DOCUMENTS 818273  7/1969  Canada .................................... 248/169

*Primary Examiner*—Rodney H. Bonck
*Attorney, Agent, or Firm*—Hopgood, Calimafde, Kalil, Blaustein & Lieberman

[57] ABSTRACT

The invention contemplates an improved tripod mount for cameras or the like and embodying the feature of simplified raised or lowered adjustment of camera height, as well as the feature of adjustably spreading and/or collapsing the legs in a single unitary motion which can add the convenience of floor rollability when desired.

11 Claims, 11 Drawing Figures

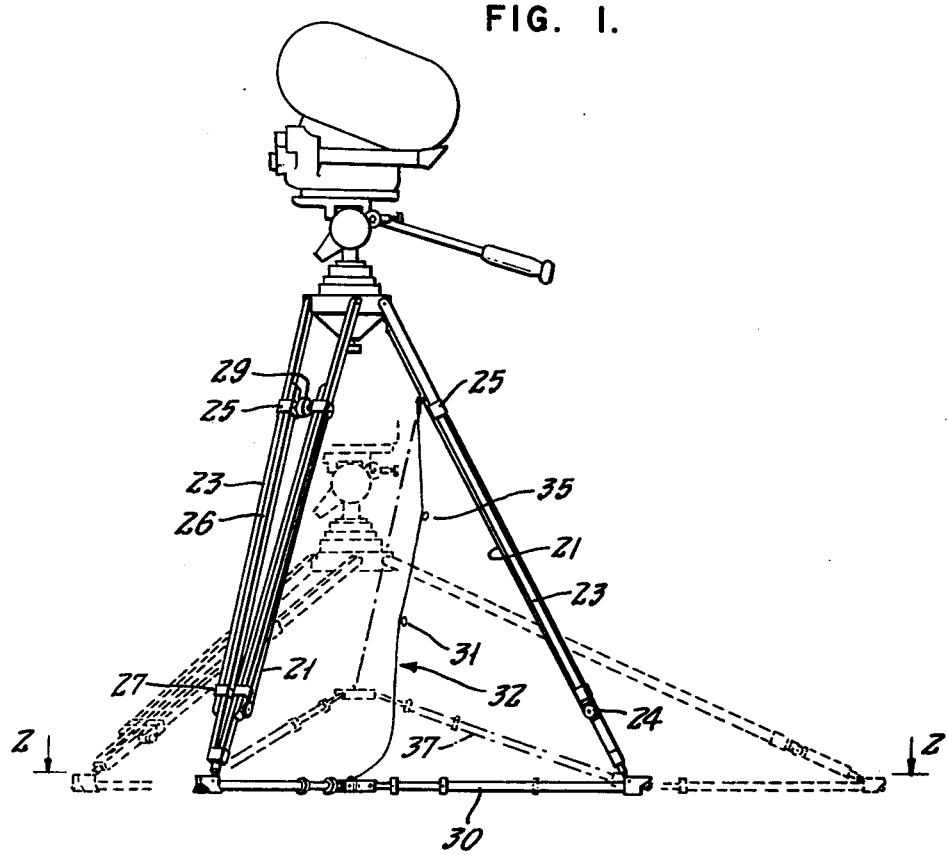
FIG. 1.
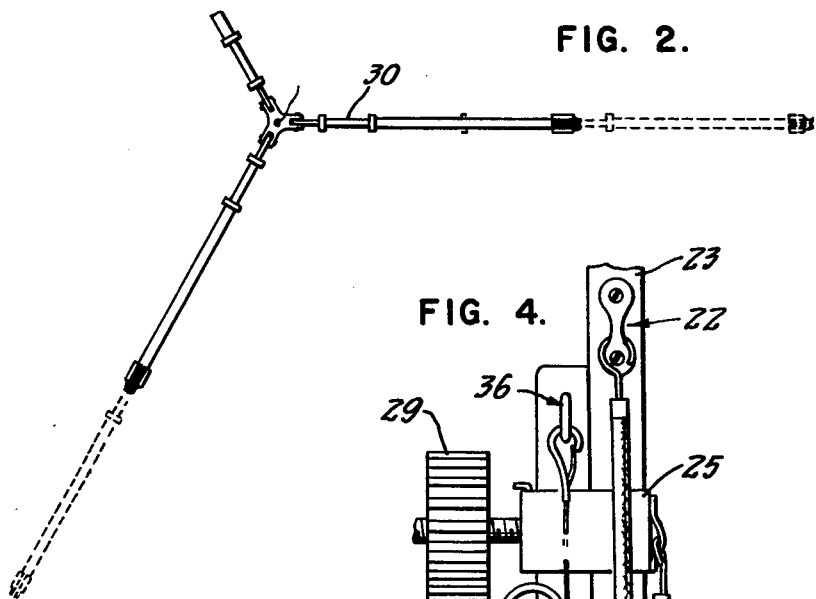
FIG. 2.
FIG. 3.
FIG. 4.

FIG. 8.
FIG. 7.
FIG. 9.
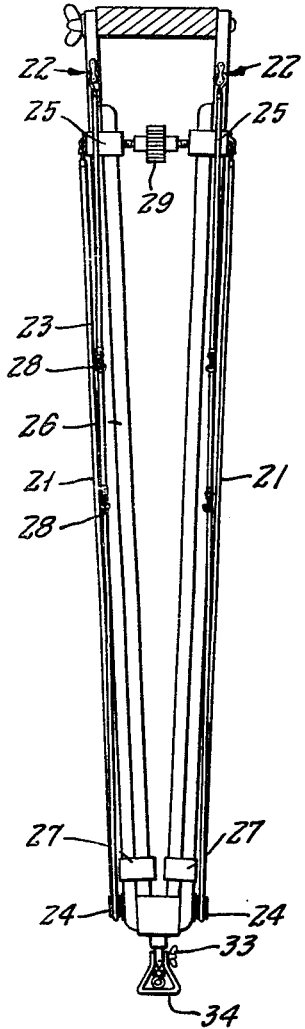
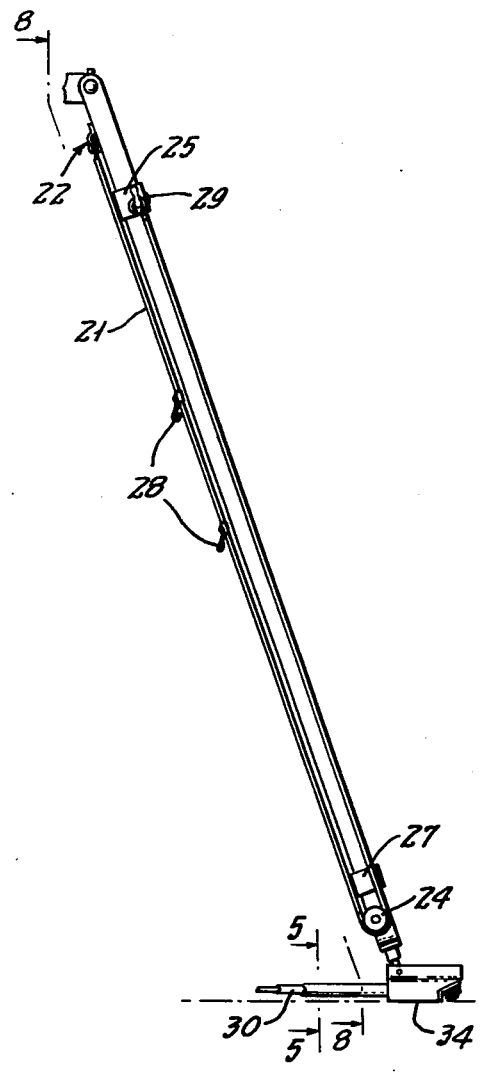
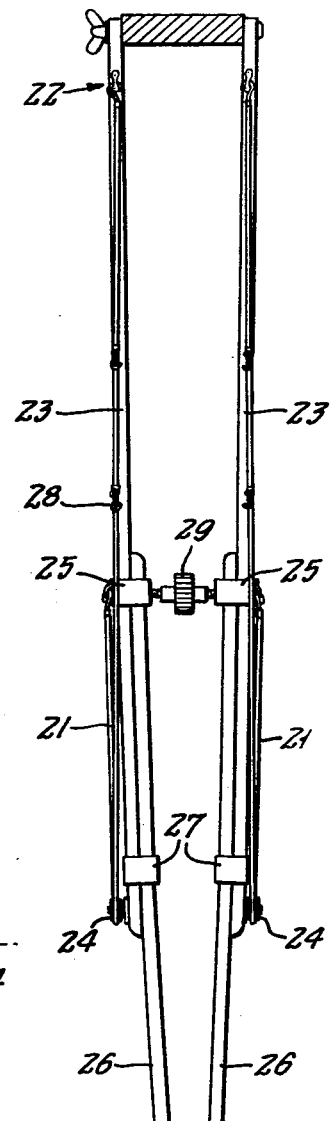
FIG. 5.
FIG. 6.
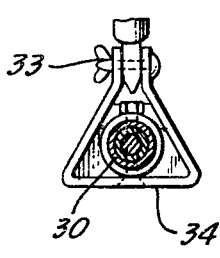
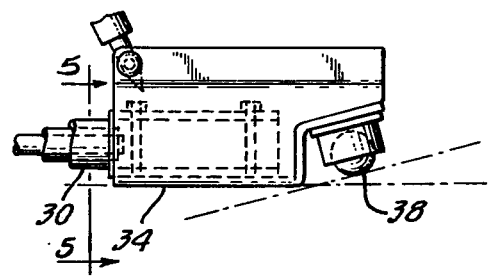

FIG. 10.
FIG. 11.
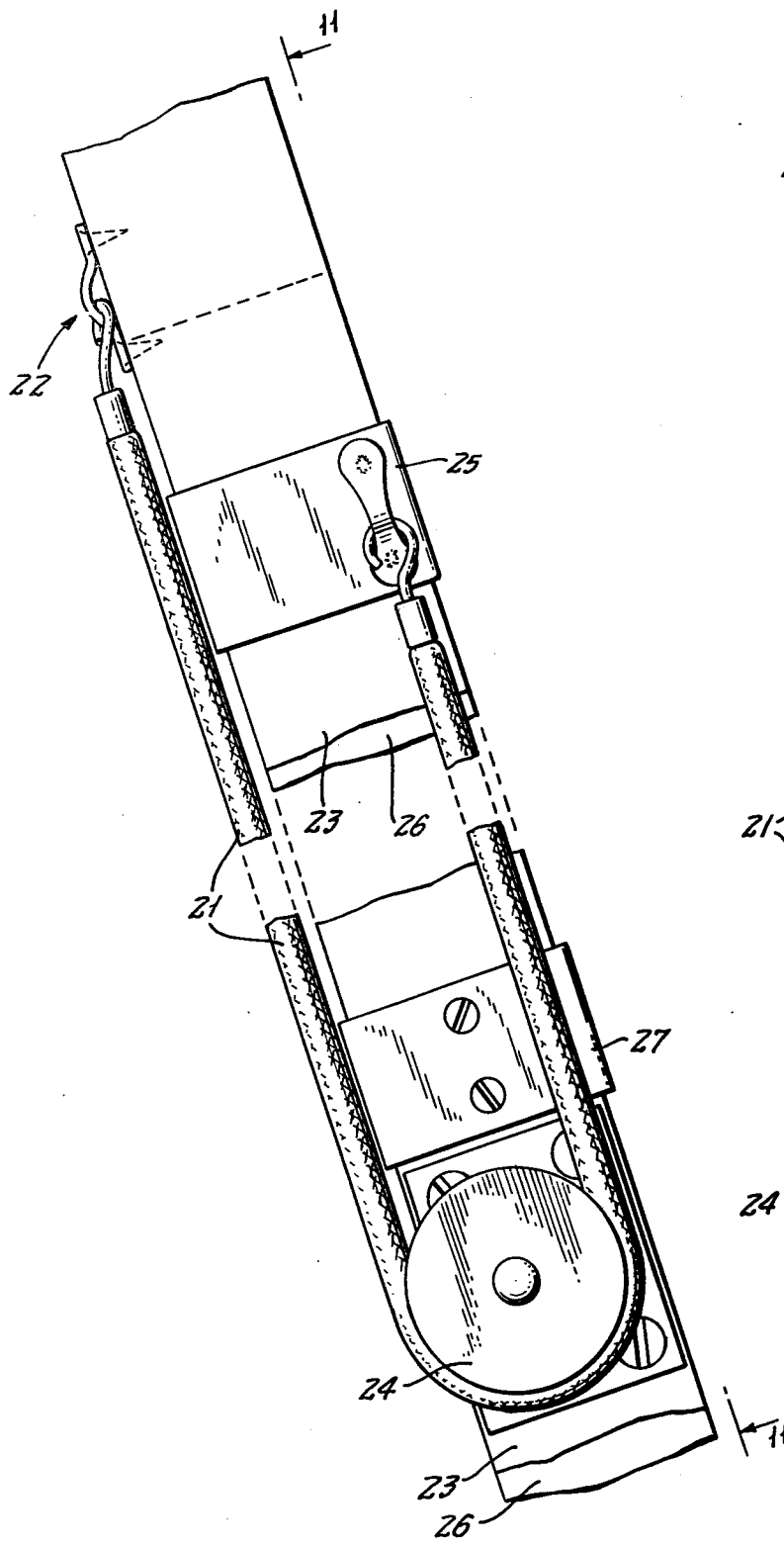
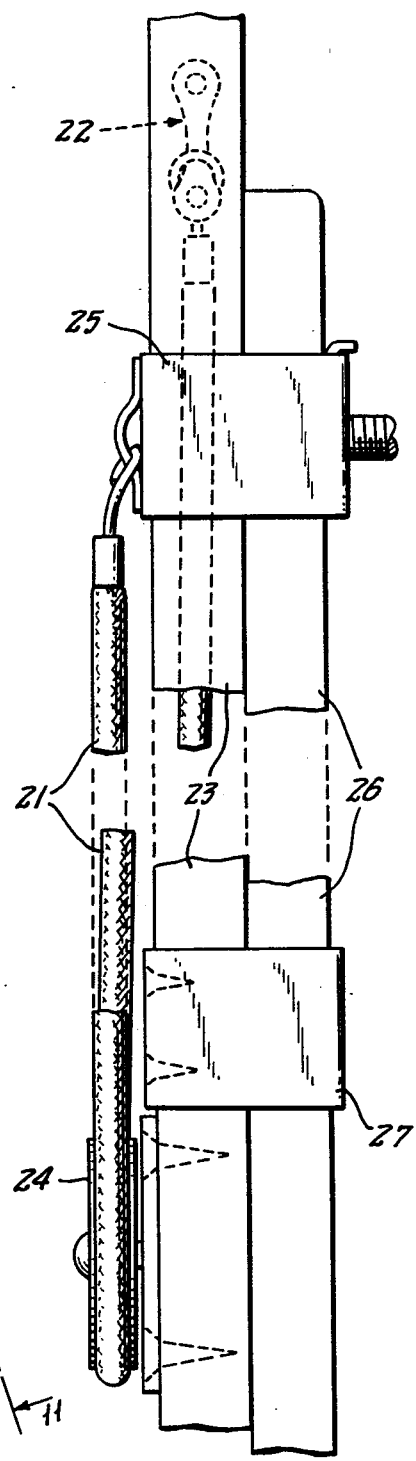

CAMERA TRIPOD

BACKGROUND OF THE INVENTION

Motion picture photography usually involves much changing of the height and position of the camera between shots. With the conventional motion picture tripod, every change of height necessitates adjusting each of the three legs individually, meanwhile supporting the weight of the tripod plus the weight of the camera, which is often very considerable. The process frequently has to be repeated several times because of the difficulty of attaining an exact height under such awkward circumstances.

The tripod is generally used with a three-armed base commonly called a "triangle" in the trade (although it is not triangular but star-shaped) which serves to keep the legs from spreading too far. In use, the triangle must first be spread on the floor, and the points of the tripod legs inserted in small cups on each arm of the triangle. This is extremely difficult to manage without getting down to floor level and putting the points in place at close range. Then the points must be secured by one means or another, usually involving much turning down of set-screws, a job which must also be done at floor level. With many triangles these set-screws must be loosened and then re-tightened every time tripod height is changed.

Whenever the camera is moved any distance, the entire assemblage—camera, tripod, and triangle—must be picked up bodily and carried. Frequently the triangle falls off at this point, whereupon the whole process must be gone through again.

When a shot near floor level is needed, the camera and the tripod head must be removed from the legs, the legs removed from the triangle, a set of short legs attached to the triangle, and the camera and tripod head attached to these legs. When the shot is finished the whole process must be gone through again in reverse.

All of these time-consuming (and thus exceedingly expensive) inconveniences can be eliminated totally or reduced drastically by the addition to the conventional tripod of the modifications proposed here.

DESCRIPTION OF THE INVENTION

The tripod-mount embodying the present invention is shown in a form applicable chiefly, though not uniquely, to moving picture cameras. Since there are several novel features in the design, it is best to consider each in turn, although they tend to complement each other in the operation of the device.

In the drawings, which show, for illustrative purposes only, a preferred form of the invention:

FIG. 1 is a side-elevation view of a tripod mount of the invention, shown in use, supporting a camera;

FIG. 2 is a plan view of leg-retaining means of the tripod of FIG. 1;

FIG. 3 is a side view of the tripod of FIG. 1, in collapsed condition;

FIG. 4 is an enlarged fragmentary side view of leg-length adjustment mechanism of the tripod of FIG. 1;

FIGS. 5 and 6 are, respectively, fragmentary side and front elevation views of one of the leg-retaining parts of FIG. 2, the aspect of FIG. 5 being as viewed at the section line 5–5 of FIGS. 6 and 7;

FIGS. 7 and 8 are, respectively, side and front-elevation views of one of the legs of the tripod of FIG. 1, in shortened condition, the aspect of FIG. 8 being as viewed from the alignment 8–8 of FIG. 7;

FIG. 9 is a fragmentary view similar to FIG.8, for an extended condition; and

FIGS. 10 and 11 are, respectively, enlarged, fragmentary, side and front-elevation views of preloaded spring means incorporated in length-adjustment structure of each of the legs of the tripod of FIG. 1.

In the tripod shown in the drawings, each of the legs comprises a pair of upper-leg elements 23 having vertically adjustable overlap with a corresponding pair of lower-leg elements 26, via spaced sliding collars 24–25 respectively carried by the overlapping ends of leg elements 23–26. And in accordance with the invention, elastic means 21 associated with each overlapping pair of upper and lower leg elements 23–26 is so preloaded in tension that the mounted camera is automatically thrust upward, unless restrained or locked in place.

FIGS. 7 and 8 show one tripod leg in a fully shortened, or collapsed, configuration, from the front and side. FIG. 9 shows the same leg in partially extended position from the front. FIGS. 10 and 11 show a detail of the same leg, from the side and front, displaying in larger scale the elastic element 21 repeated identically on each side of each of the three legs, which tends to lengthen the leg, thus providing upward thrust on the camera.

The element is a length of shock cord—a cloth-covered, heavy-duty rubber strip, with a round cross-section. The shock cord extends from a mount 22 on the top part of the upper leg 23, around a pulley 24 attached to the bottom of the upper leg, and then up to a mount on the sliding collar 25. This collar is integral with the lower section 26 of the leg.

Other sliding collars 27 have the function of guiding the two leg sections, so that they slide parallel to one another. It is clear from a comparison of FIGS. 8 and 9 that the shock cord 21 is more fully contracted in FIG. 9 than in FIG. 8. Therefore, the shock cord's action will tend to put the leg in the FIG. 9 configuration. In other words, the shock cord contracts while the leg extends, and this action raises the tripod.

The length of the shock cord is such that the combined tension of the six cords together is just sufficient to raise the tripod to its fullest height when loaded with the lightest camera to be used with it. Additional hooks 28 in the shock cords are provided to give greater tension for heavier cameras. It should be noted that although shock cords are discussed here for purposes of illustration, it is within the scope of the invention to use any of a number of other means of spring-loading the legs.

As in existing tripods, knurled and threaded connectors 29, one on each leg, tighten the collars 25 against the adjoining leg section which these collars encircle, thus locking them in fixed mutual relationship and preventing further extension or contraction of the leg.

To raise the camera, the operator simply places one hand on it, and with the other releases the connectors 29. He then allows the camera to rise as far as required. This point is determined easily and with precision because the operator is relieved of the extreme inconvenience of lengthening three different legs one after another, and of supporting the weight of camera and tripod while doing so. Once the desired point is reached, the three connectors are again tightened, locking the legs in place.

Additional features of the tripod remain to be examined. Attention is called to the foldable star-shaped base or "spreader" 30 shown in FIGS. 1 and 2; the expression "star-shaped" is adopted because the three arms of spreader 30 extend radially (from articulated connection to a central hub) to provide three outer "points" of tripod-leg location, in the manner of the points of a star. This is an integral part of the tripod, not a separate accessory, as heretofore. To fold the spreader, the lower ring 31 tied into the wire 32 is pulled upward causing the spreader center to rise within the tripod until the latter takes the compact configuration of FIG. 3, with legs parallel. Thus it can be easily stored. When the legs are separated once more, the spreader falls into place, ready for use.

The spreader 30 can be enlarged by lengthening all three arms as best shown in FIG. 2. Spring-loaded pins, not shown in detail, engage holes in the telescoping spreader arms in order to keep them at the desired degree of extension. Extending the spreader lowers the head of the tripod, as shown in FIG. 1 in dotted line. This feature eliminates the need for substitution of a special set of short legs when shooting from points close to the ground. Bolts secure the spreader to the tripod legs are fitted with wing nuts 33, allowing the entire spreader to be removed for special situations, such as rough exterior terrain.

The third main feature of the invention is the swiveling foot, shown in front and side view, FIGS. 5 and 6. Each arm of the spreader 30 terminates in one of these assemblies, which contacts the ground on a broad flat base 34 while the spreader is flat on the ground, as shown in FIG. 1 in solid line, and suggested in FIG. 6 by the horizontal phantom-line orientation. However, by pulling the upper ring 35 tied into the wire 32 and hooking it over the wire's mount 36, the central hub of the spreader may be partially raised, as shown in dot-dash line configuration 37, FIG. 1 and suggested in FIG. 6 by the inclined phantom-line orientation, tangent to the ball 38. When the spreader hub is thus raised, the freely revolving balls 38 are brought into ground contact, lifting the entire assembly off the flat bases. Thus modified, the tripod can be easily rolled across any flat surface to a new location. Simply unhooking the ring 35 will cause the spreader to assume its normal configuration, flat and firm on the floor.

I claim the following:

1. A tripod, comprising mounting means for removable mounting of a camera or the like, three legs having independently articulating connection at their upper ends to said mounting means, and a spreader base comprising three centrally and pivotally connected spreader arms having articulating connection at their outer ends to the respective lower ends of said legs, whereby when lowered to rest upon a floor plane, said legs are radially outwardly positioned and upon raising the central connection of said spreader arms, all legs may be radially retracted; each spreader arm including a roller element at a location radially outside the point of leg connection thereto, said roller element being retracted from the floor plane for the lowered condition of said spreader base, and said roller elements being in rolling contact with the floor plane for a raised condition of the central connection of said spreader arms.

2. A tripod, comprising mounting means for removable mounting of a camera or the like, three legs having independently articulating connection at their upper ends to said mounting means, and a spreader base comprising three centrally and pivotally connected spreader arms having articulating connection at their outer ends to the respective lower ends of said legs, whereby when lowered to rest upon a floor plane, said legs are radially outwardly positioned and, upon raising the central connection of said spreader arms, all legs may be radially retracted; each of said legs being extendable and including slidably guided upper and lower leg sections, elongate flexible means including a tension spring connecting corresponding end regions of said leg sections via pulley means at the opposite end region of one of said leg sections, and selectively operable clamping means for retaining a given extension setting of said leg section.

3. The tripod of claim 2, in which the arms of said spreader base are selectively adjustable as to length.

4. The tripod of claim 2, in which connection of said legs to said spreader-base arms is selectively removable.

5. A tripod, comprising mounting means for removable mounting of a camera or the like, three legs having independently articulating connection at their upper ends to said mounting means, and a spreader base comprising three centrally and pivotally connected spreader arms having articulating connection at their outer ends to the respective lower ends of said legs, whereby when lowered to rest upon a floor plane, said legs are radially outwardly positioned and, upon raising the central connection of said spreader arms, all legs may be radially retracted; and remotely actuable lifting means connecting the central connection of said spreader arms to an elevated location on said tripod.

6. The tripod of claim 5, in which said lifting means includes a flexible line, and means for selectively connecting a shortened length-portion thereof to the elevated location on the tripod, for achieving a predetermined collapse of the radial spread of said legs.

7. A tripod, comprising mounting means for removable mounting of a camera or the like, three legs having independently articulating connection at their upper ends to said mounting means, and a spreader base comprising three centrally and pivotally connected spreader arms having articulating connection at their outer ends to the respective lower ends of said legs, whereby when lowered to rest upon a floor plane, said legs are radially outwardly positioned and, upon raising the central connection of said spreader arms, all legs may be radially retracted; each of said legs being extendable and including slidably guided upper and lower leg sections, and selectively operable clamping means for retaining a given extension setting of said leg sections; said upper leg section comprising two spaced upper-leg members connected to said mounting means and said lower-leg section comprising two lower-leg members connected to each other at their lower ends, said lower-leg members having guided sliding overlap at their upper ends with the lower ends of said upper-leg members, said spring means comprising individual shock-cord means connecting corresponding overlapping upper and lower leg members.

8. A tripod, comprising mounting means for removable mounting of a camera or the like, three legs having independently articulating connection at their upper ends to said mounting means, each leg comprising two spaced upper-leg members connected at their upper ends to said mounting means and two lower-leg members connected to each other at their lower ends, said lower-leg members having guided sliding overlap at their upper ends with the lower ends of said upper-leg members, spring means comprising individual shock-cord means connecting corresponding overlapping upper and lower leg memebers and prestressed to urge said upper and lower leg members to extended relation, and selectively operable clamping means for retaining a given extension setting of said legs.

9. The tripod of claim 8, in which said clamping means includes for each leg a single clamp actuator serving for each leg the respective pairs of overlapping upper and lower leg members.

10. The tripod of claim 8, in which each shock cord is of finite length with each of its ends anchored to a different one of the associated upper and lower leg members, and pulley means carried by one of said associated members with an intermediate part of the shock cord span riding said pulley means.

11. The tripod of claim 10, in which the anchorage at one shock-cord end is selectively removable, and in which optional anchor means carried by said shock cord near said removable end is selectively anchorable to the associated leg to effectively increase the spring force of said shock cord to adapt the same for mounted cameras of different weight.

* * * * *